(12) United States Patent
Mishra (10) Patent No.: US 7,426,327 B2
(45) Date of Patent: Sep. 16, 2008

(54) LOW ATTENUATION NON-ZERO DISPERSION SHIFTED OPTICAL FIBER

(75) Inventor: Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/603,450

(22) Filed: Nov. 22, 2006

(65) Prior Publication Data

US 2007/0116418 A1 May 24, 2007

Related U.S. Application Data

(60) Provisional application No. 60/739,903, filed on Nov. 23, 2005.

(51) Int. Cl.
*G02B 6/02* (2006.01)
(52) U.S. Cl. ....................................... 385/123
(58) Field of Classification Search ........................ None
See application file for complete search history.

(56) References Cited

U.S. PATENT DOCUMENTS

| 3,853,673 | A | 12/1974 | Levene et al. ............... 161/1 |
| 3,938,974 | A | 2/1976 | Macedo et al. ............... 65/3 R |
| 3,957,342 | A | 5/1976 | Newns et al. ............... 385/141 |
| 3,971,645 | A | 7/1976 | Bachmann et al. ............. 65/3 A |
| 4,225,330 | A | 9/1980 | Kakuzen et al. ............... 65/18 |
| 4,277,270 | A | 7/1981 | Krohn ......................... 65/3 A |
| 4,310,341 | A | 1/1982 | Barns et al. ................ 65/3.12 |
| 4,336,048 | A | 6/1982 | Van der Steen et al. ....... 65/18.4 |
| 4,336,049 | A | 6/1982 | Takahashi et al. ............ 65/3.12 |
| 4,388,098 | A | 6/1983 | Takahashi et al. ............. 65/157 |
| 4,418,985 | A | 12/1983 | Kasori et al. ............... 350/96.34 |
| 4,419,115 | A | 12/1983 | Johnson, Jr. et al. ......... 65/3.12 |
| 4,504,297 | A | 3/1985 | Kosinski et al. ............. 65/3.11 |
| 4,515,612 | A | 5/1985 | Burrus, Jr. et al. .......... 65/3.12 |
| 4,579,571 | A | 4/1986 | Hicks, Jr. .................... 65/3.12 |
| 4,645,524 | A | 2/1987 | Bocko et al. ................. 65/18.1 |
| 4,768,859 | A | 9/1988 | Kosori et al. ............. 350/96.34 |
| 4,902,426 | A | 2/1990 | Macedo et al. ................. 65/31 |

(Continued)

FOREIGN PATENT DOCUMENTS

EP           0793122           9/1977

(Continued)

OTHER PUBLICATIONS

Lines, "Optical losses from compositional fluctuations in three-component glasses", Journal of Non-Crystalline Solids 195 (1996) 249-260.

(Continued)

*Primary Examiner*—Michelle R. Connelly-Cushwa
*Assistant Examiner*—Chris Chu
(74) *Attorney, Agent, or Firm*—Joseph M. Homa; Matthew J. Mason (57) ABSTRACT

An optical waveguide fiber having a zero-dispersion wavelength less than 1450 nm, a dispersion slope at a wavelength of 1550 of less than 0.06 ps/nm²/km nm, and attenuation at a wavelength of 1550 nm less than 0.190 dB/km. Optical fibers are disclosed that exhibit an effective area at a wavelength of 1550 nm of greater than 50 μm², and dispersion at a wavelength of 1550 nm between 5 and 15 ps/nm-km.

19 Claims, 5 Drawing Sheets

U.S. PATENT DOCUMENTS

| | | | |
|---|---|---|---|
| 4,925,472 A | 5/1990 | Di Vita | 65/2 |
| 4,988,162 A | 1/1991 | Hayami | 350/96.25 |
| 5,106,402 A | 4/1992 | Geittner et al. | 65/3.12 |
| 5,146,534 A | 9/1992 | Lines | 385/142 |
| 5,152,817 A | 10/1992 | Bennett et al. | 65/3.1 |
| 5,240,488 A | 8/1993 | Chandross et al. | 65/3.11 |
| 5,306,322 A | 4/1994 | Ishikawa et al. | 65/3.12 |
| 5,327,516 A | 7/1994 | Chraplyvy et al. | 385/123 |
| 5,553,185 A | 9/1996 | Antos et al. | 385/127 |
| 5,781,684 A | 7/1998 | Liu | 385/124 |
| 5,905,838 A * | 5/1999 | Judy et al. | 385/123 |
| 6,116,055 A | 9/2000 | Ishikawa et al. | 65/399 |
| 6,131,415 A | 10/2000 | Chang et al. | 65/391 |
| 6,153,546 A | 11/2000 | Saitoh et al. | 501/37 |
| 6,169,837 B1 | 1/2001 | Kato et al. | 385/127 |
| 6,343,175 B1 | 1/2002 | Sasaoka | 385/123 |
| 6,632,759 B2 | 10/2003 | Borrelli et al. | 501/66 |
| 6,705,127 B1 | 3/2004 | Cain et al. | 65/421 |
| 6,970,630 B2 * | 11/2005 | Sigel et al. | 385/123 |
| 7,088,900 B1 * | 8/2006 | Mishra | 385/123 |
| 2002/0031320 A1 | 3/2002 | Nagayama et al. | 385/127 |
| 2002/0197036 A1 | 12/2002 | Kim et al. | 385/123 |
| 2003/0081921 A1 | 5/2003 | Sillard et al. | 385/124 |
| 2003/0087743 A1 | 5/2003 | Dejneka et al. | 501/42 |
| 2003/0118304 A1 | 6/2003 | Shibuta | 385/124 |
| 2003/0128948 A1 | 7/2003 | Tirloni et al. | 385/127 |
| 2003/0210877 A1 * | 11/2003 | Berkey et al. | 385/123 |
| 2004/0057692 A1 | 3/2004 | Ball et al. | 385/142 |
| 2004/0202435 A1 * | 10/2004 | Bickham et al. | 385/123 |
| 2004/0206127 A1 | 10/2004 | Coffey et al. | 65/390 |
| 2004/0240814 A1 * | 12/2004 | Boek et al. | 385/123 |
| 2005/0063663 A1 | 3/2005 | Anderson et al. | 385/142 |
| 2005/0089289 A1 | 4/2005 | Hayami et al. | 385/127 |
| 2007/0196061 A1 * | 8/2007 | Bickham et al. | 385/123 |

FOREIGN PATENT DOCUMENTS

| | | |
|---|---|---|
| EP | 0321182 | 6/1989 |
| EP | 0673895 | 9/1995 |
| EP | 0902307 | 3/1999 |
| EP | 0915065 | 5/1999 |
| EP | 1038845 | 10/2003 |
| GB | 1289673 | 9/1972 |
| GB | 1598760 | 9/1981 |
| GB | 2126820 | 3/1984 |
| GB | 2149392 | 6/1985 |
| JP | 62-80606 | 4/1987 |
| JP | 62-283845 | 12/1987 |
| JP | 63-40744 | 2/1988 |
| JP | 63-195147 | 8/1988 |
| WO | WO00/64825 | 2/2000 |
| WO | WO00/64824 | 11/2000 |
| WO | WO01/47822 | 5/2001 |
| WO | WO02/51761 | 4/2002 |

OTHER PUBLICATIONS

Lines et al., "Calcium Aluminate Glasses As Potential Ultralow-Loss Optical Materials At 1.5-1.9 μm", Journal of Non-Crystalline Solids 107 (1989) 251-260.

Lines, "Can the minimum attenuation of fused silica be significantly reduced by small compositional variations? I. Alkali metal dopants", Journal of Non-Crystalline Solids 171 (1994) 209-218.

Lines, "Can the minimum attenuation of fused silica be significantly reduced by small compositional variations? II. Combined fluorine and alkali metal dopants", Journal of Non-Crystalline Solids 171 (1994) 219-227.

Nagayama, et al., "Ultra Low Loss (0.151 dB/km) Fiber and its Impact on Submarine Transmission Systems", OFC 2002 Postdeadline Papers, FA10-1-FA10-3.

Nagel et al., "Compound-Glass Waveguides Fabricated By A Metal Evaporation Technique",., Journal of The American Ceramic Society, vol. 59, No. 1-2, p. 47-49, Jan.-Feb. 1976.

Patent abstract of JP60-108327, published Jun. 13, 1985, in the name of Olympus Optical Co. Ltd; entitled Production of Ion-Selective Glass; application date Nov. 14, 1983.

Palais, Joseph C., "Fiber Optic Communications", 1984, Prentice-Hall, Inc., New Jersey, p. 96-100, Optic Fiber Waveguides.

Saito et al., "A new method of developing ultralow-loss glasses", Journal Applied Physics, vol. 81, No. 11, Jun. 1997, p. 7129-7134.

Tian, et al., "Effect of water incorporation on the diffusion of sodium in an alkaline-earth boroaluminosilicate glass", Journal of Non-Crystalline Solids 296 (2001), pp. 123-134.

* cited by examiner

LOW ATTENUATION NON-ZERO DISPERSION SHIFTED OPTICAL FIBER

This application claims the benefit of U.S. Provisional Application No. 60/739,903, filed Nov. 23, 2005, entitled "LOW ATTENUATION NON-ZERO DISPERSION SHIFTED OPTICAL FIBER."

BACKGROUND OF THE INVENTION

1. Field of the Invention

The present invention relates to non-zero dispersion shifted optical fibers (NZDSF), or NZDS fibers, or NZ-DSF's.

2. Technical Background

Telecommunication systems, in both submarine and terrestrial deployments, require optical fiber which is capable of transmitting signals for long distances with as little signal degradation as possible. As new technologies are further developed, such as wavelength division multiplexing (WDM) and higher channel speeds, an ever-growing demand for network bandwidth is heightened. However, optical fiber attributes such as attenuation and bend loss are major contributing factors to the degradation of signals. Reduction of one or more of these factors would help to reduce or even eliminate the number of signal amplifications required in a network, which could reduce the cost of the network and increase the network efficiency.

Wavelength division multiplexing (WDM) systems have operated around the 1550 nm wavelength region, defined herein as including the C-band, and the L-band, which includes wavelengths between about 1565 nm to about 1625 nm. Some known fibers have a zero dispersion wavelength located outside the operation window which may help prevent nonlinear penalties such as four-wave mixing (FWM) and cross-phase modulation (XPM). However, the attenuation of known NZDSF fibers is not among the lowest of fibers.

Preferably, coarse wavelength division multiplexing (CWDM) systems and applications operate in the WDM 1550 nm window, i.e. in the C-and L-bands, in the S-band (between about 1450 nm and about 1525 nm), and in the 1310 nm window (between about 1280 nm and about 1330 nm).

SUMMARY OF THE INVENTION

Optical waveguide fibers disclosed herein are low attenuation, moderate dispersion optical fibers. The optical fibers are non-zero dispersion shifted optical fibers (NZDSF), or NZDS fibers, or NZ-DSF's. The optical fibers comprise relative refractive index profiles selected to provide: a zero-dispersion wavelength less than 1450 nm, preferably less than 1430 nm, more preferably between 1340 and 1430 nm, even more preferably between 1340 and 1420 nm; a dispersion slope at a wavelength of 1550 of less than 0.06 ps/nm$^2$/km nm, preferably between 0.050 and 0.060 ps/nm$^2$/km; and attenuation at a wavelength of 1550 nm less than 0.190 dB/km, preferably less than 0.185 dB/km, more preferably less than 0.180 dB/km.

Preferably, the optical fiber exhibits an effective area at a wavelength of 1550 nm of greater than 50 µm$^2$, preferably greater than 55 µm$^2$. In some preferred embodiments, the effective area at a wavelength of 1550 nm is between 55 µm$^2$ and 70 µm$^2$; in other preferred embodiments, the effective area at a wavelength of 1550 nm is between 55 µm$^2$ and 65 µm$^2$.

Preferably, the dispersion at a wavelength of 1550 nm is between 5 and 15 ps/nm-km, more preferably between 6 and 13 ps/nm-km, and in some preferred embodiments between 6 and 10 ps/nm-km.

Preferably, the dispersion at a wavelength of 1625 nm is less than 20 ps/nm-km, preferably less than 18 ps/nm-km, and in some preferred embodiments less than 17.0 ps/nm-km.

Preferably, the dispersion at a wavelength of 1440 nm is greater than 1.0 ps/nm-km, more preferably between 1.0 and 8.0 ps/nm-km, and in some preferred embodiments between 1.0 and 7.0 ps/nm-km.

Preferably, the absolute magnitude of the dispersion at a wavelength of 1400 nm is less than 5.0 ps/nm-km, and in some preferred embodiments less than 4.0 ps/nm-km.

Preferably, the absolute magnitude of the dispersion at a wavelength of 1310 nm is less than 8.0 ps/nm-km, and in some preferred embodiments less than 7.0 ps/nm-km.

Preferably, the dispersion slope at a wavelength of 1310 nm is less than 0.080 ps/nm$^2$-km.

Preferably, the mode field diameter at a wavelength of 1310 nm is greater than 7.0 µm, preferably greater than 7.2 µm$^2$.

Preferably, the optical fiber exhibits a cable cutoff less than 1550 nm, more preferably less than 1500 nm. In some preferred embodiments, the cable cutoff is less than 1450 nm. In other preferred embodiments, the cable cutoff is less than 1400 nm. In still other preferred embodiments, the cable cutoff is less than 1300 nm. In other preferred embodiments, the cable cutoff is less than 1260 nm.

Preferably the optical fiber described and disclosed herein allows suitable performance at a plurality of wavelengths from about 1260 nm to about 1650 nm. In preferred embodiments, the optical fiber described and disclosed herein is a multi-window fiber which can accommodate operation in at least the 1310 nm window and the 1550 nm window.

Reference will now be made in detail to the present preferred embodiments of the invention, examples of which are illustrated in the accompanying drawings.

DETAILED DESCRIPTION OF THE PREFERRED EMBODIMENT

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the refractive index of pure (undoped) silica. As used herein, the relative refractive index is represented by $\Delta$ and its values are given in units of "%", unless otherwise specified. In cases where the refractive index of a region is less than the refractive index of pure silica, the relative index percent is negative and is referred to as having a depressed region or depressed index. In cases where the refractive index of a region is greater than the refractive index of pure silica, the relative index percent is positive and the region can be said to be raised or to have a positive index. An "updopant" or an index-increasing dopant is herein considered to be a dopant which has a propensity to raise the refractive index relative to pure undoped $SiO_2$. A "downdopant" or an index-decreasing dopant is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r\, dr)^2 / (\int f^4 r\, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" or "alpha-profile" refers to a relative refractive index profile, expressed in terms of Δ(r) which is in units of "%", where r is radius, which follows the equation, $$\Delta(r) = \Delta(r_o)(1 - [|r - r_o|/(r_1 - r_o)]^\alpha),$$

where $r_o$ is the point at which Δ(r) is maximum, $r_1$ is the point at which Δ(r) % is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2 = (2\int f^2 r\, dr / \int [df/dr]^2 r\, dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically connected to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

The optical fiber disclosed herein comprises a core and a cladding layer (or cladding) surrounding and directly adjacent the core. The cladding has a refractive index profile, $\Delta_{CLA}(r)$. The core comprises a refractive index profile, $\Delta_{CORE}(r)$.

In some preferred embodiments, the core of the optical fiber disclosed herein has a non-positive relative refractive index profile.

In some preferred embodiments, the core contains no germanium, i.e. no germania doped silica.

In other preferred embodiments, dopants other than germanium, singly or in combination, may be employed within the core, and particularly at or near the centerline, of the optical fiber disclosed herein.

Figure 1:
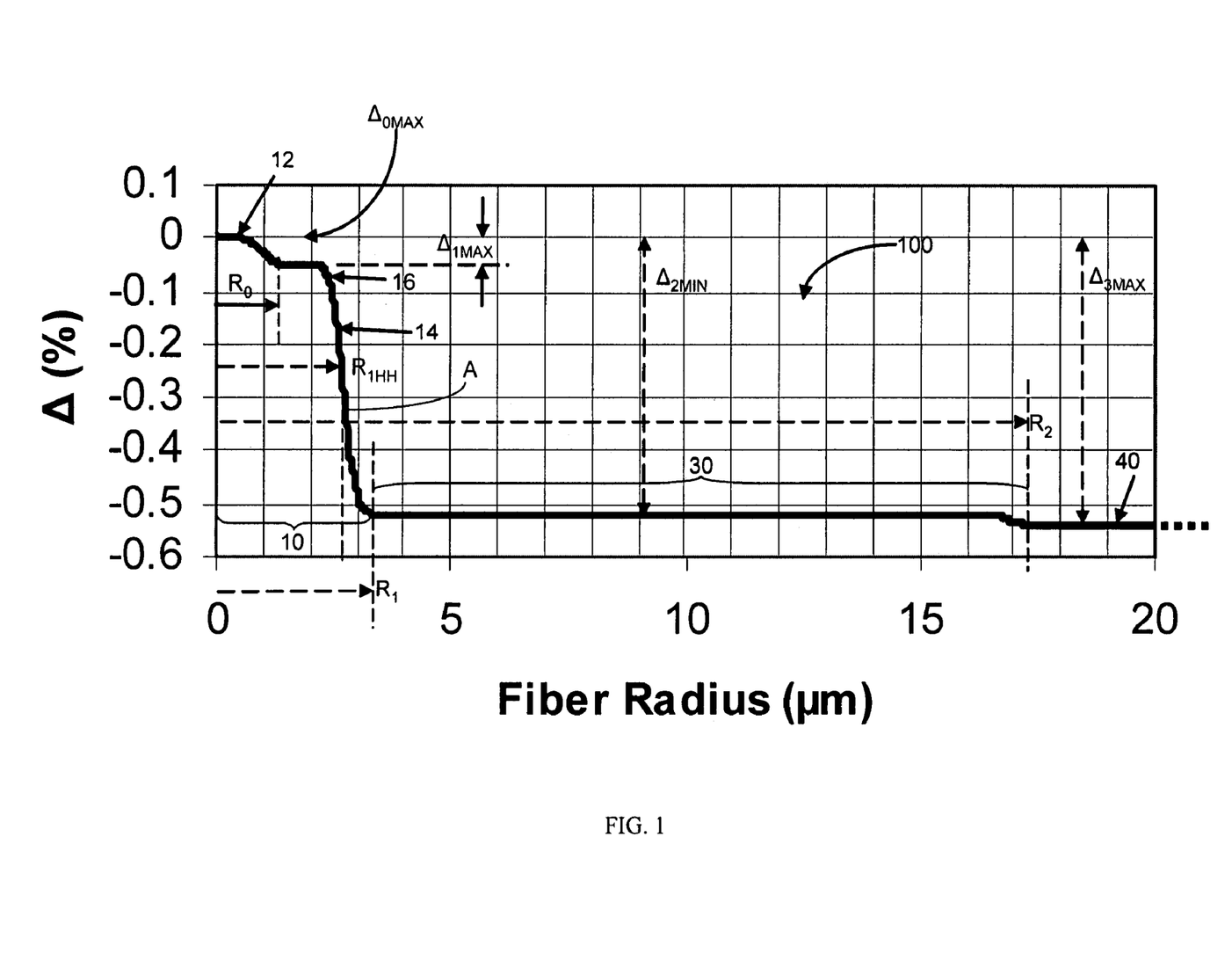
FIG. 1 shows a relative refractive index profile corresponding to a first preferred embodiment of an optical waveguide fiber as disclosed herein.
Figure 2:
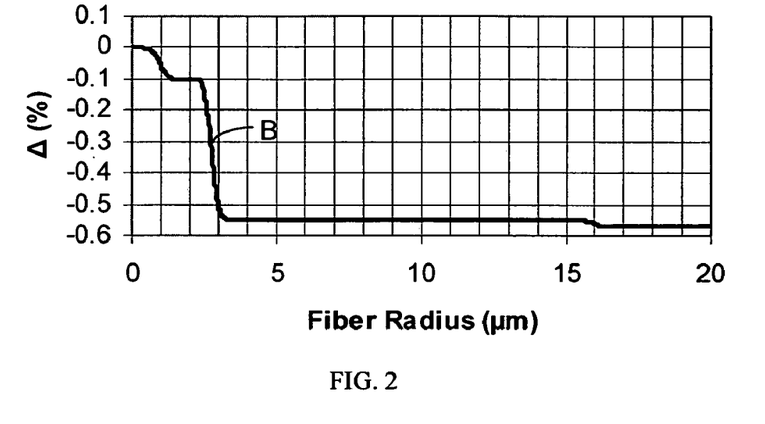
FIGS. 2-10 show relative refractive index profiles corresponding to alternate preferred embodiments of an optical waveguide fiber as disclosed herein.
Figure 3:
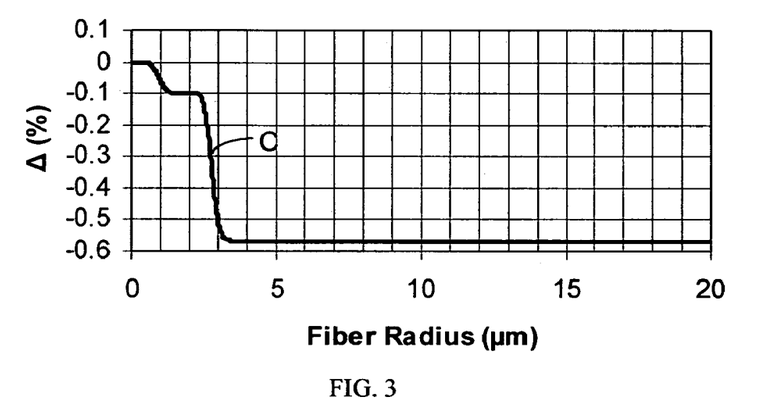
Figure 4:
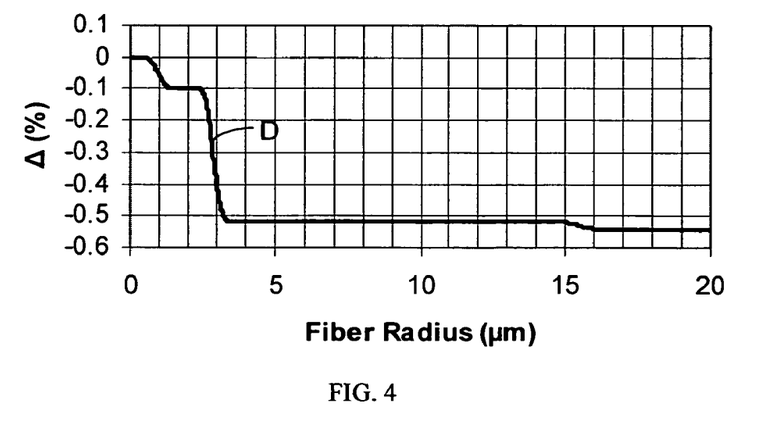
Figure 5:
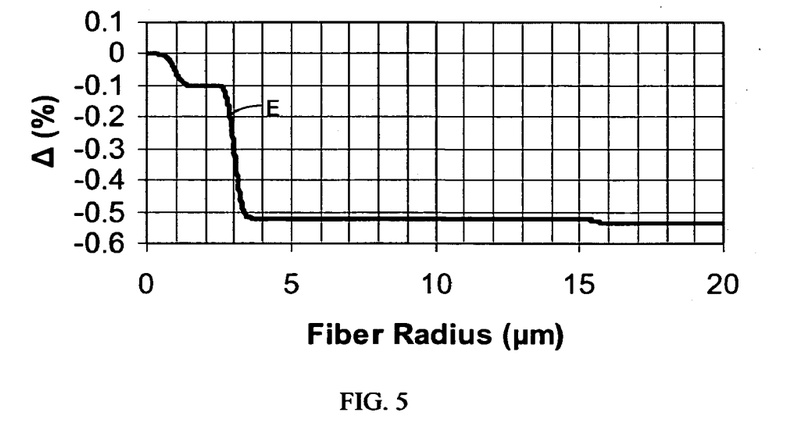
Figure 6:
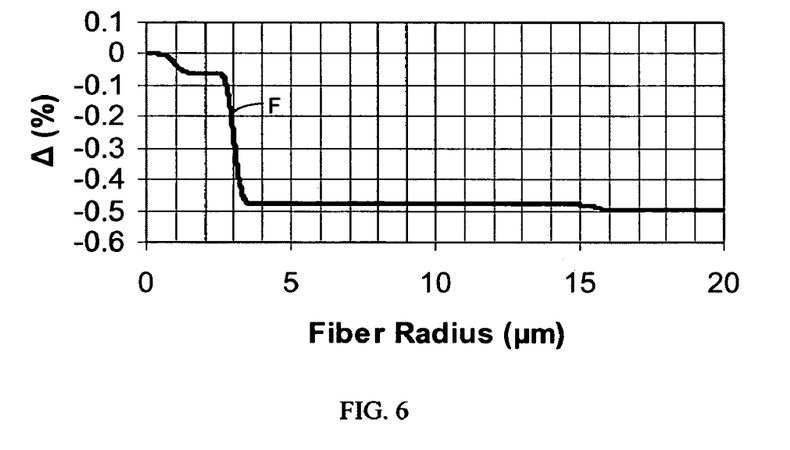
Figure 7:
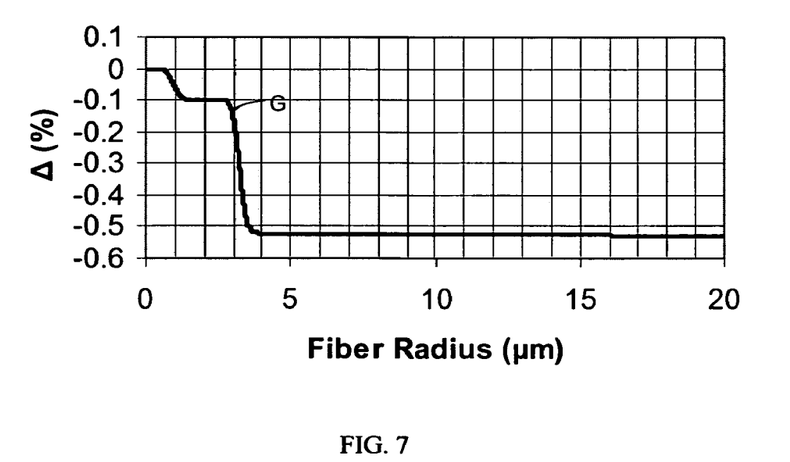
Figure 8:
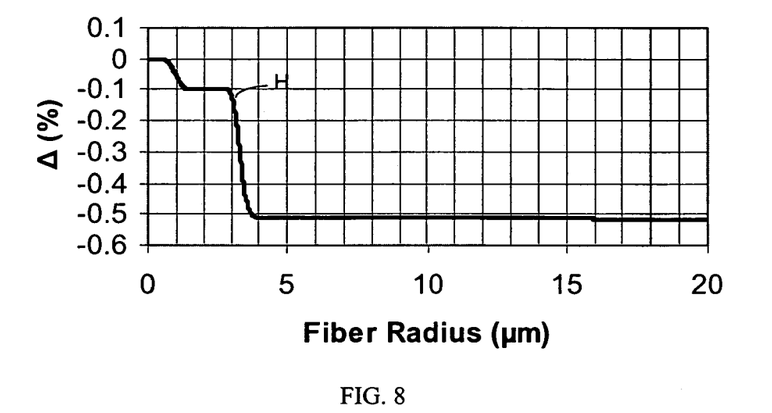
Figure 9:
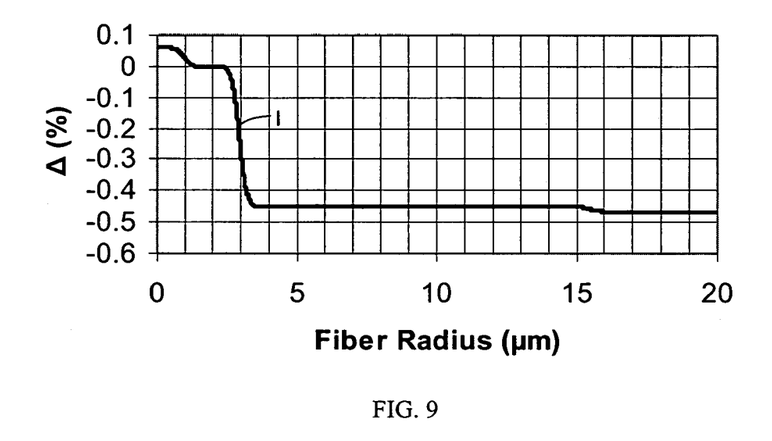
Figure 10:
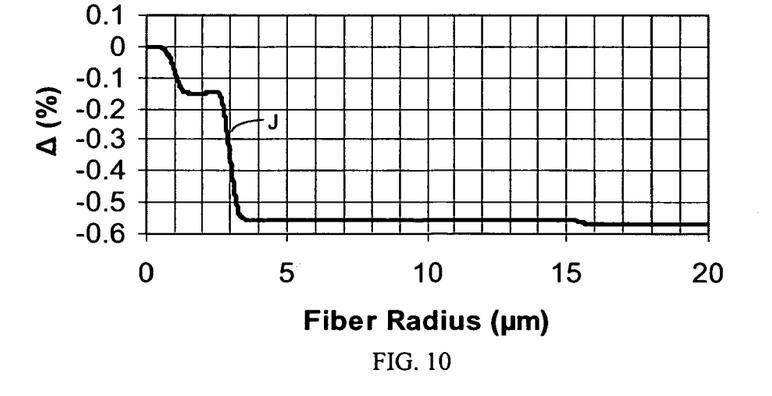

Referring to FIG. 1, optical waveguide fibers 100 are disclosed herein which comprise a central core region 10, an annular region 30 surrounding and directly adjacent the central core region 10, and an outer cladding 40 surrounding and directly adjacent the annular region 30. The central core region 10 comprises a central portion 12 and an outer portion 14 surrounding and directly adjacent the central portion 12, the central portion 12 extending radially outwardly from the centerline to a central portion outer radius, $R_0$, and having a relative refractive index percent, $\Delta_0\%(r)$ with a maximum relative refractive index percent, $\Delta_{0MAX}$, and the outer portion 14 extending radially outwardly from the central portion 12 to a core radius, $R_1$, the outer portion 14 having a relative refractive index percent, $\Delta_1\%(r)$ with a maximum relative refractive index percent, $\Delta_{1MAX}$. The annular region 30 surrounds and is directly adjacent the outer portion 14 of the central core region 10, and has a negative relative refractive index percent, $\Delta_2\%(r)$ with a maximum relative refractive index percent, $\Delta_{2MIN}$, wherein $\Delta_{2MIN} < \Delta_{1MAX} \leq \Delta_{0MAX}$, and wherein $-0.1\% \leq \Delta_{0MAX} \leq +0.1\%$. The outer cladding 40 has a relative refractive index percent, $\Delta_3\%(r)$ with a maximum relative refractive index percent, $\Delta_{3MAX}$, wherein the absolute magnitude of the difference between $\Delta_{3MAX}$ and $\Delta_{2MAX}$ is less than or equal to 0.05%, i.e. $|\Delta_{2MIN} - \Delta_{3MAX}| \leq 0.05\%$. In all of the embodiments, the cladding 40 extends radially beyond the 20 μm shown in the Figures, as represented by the dotted line beyond a radius of 20 μm in FIG. 1.

In preferred embodiments, $-0.15\% \leq (\Delta_{1MAX} - \Delta_{0MAX}) \leq -0.05\%$, and $-0.50\% \leq (\Delta_{2MAX} - \Delta_{1MAX}) \leq -0.40\%$. Preferably, $-0.60\% \leq (\Delta_{2MAX} - \Delta_{0MAX}) \leq -0.45\%$.

In some preferred embodiments, $\Delta_{0MAX}$ is non-positive, and preferably $-0.1\% \leq \Delta_{0MAX} \leq 0\%$. In other preferred embodiments, $\Delta_{0MAX}$ is 0%. In still other preferred embodiments, $\Delta_{0MAX}$ is non-negative, and preferably $0\% \leq \Delta_{0MAX} \leq 0.1\%$.

Preferably, $\Delta_{1MAX}$ is non-positive. In some preferred embodiments with a non-positive $\Delta_{1MAX}$, $-0.20\% \leq \Delta_{1MAX} \leq 0\%$. In some preferred embodiments, $\Delta_{0MAX}$ is positive and at least part of the outer portion 14 of the central core region 10 has a Δ of substantially 0% relative to pure (undoped) silica. In other preferred embodiments, at least part of the central portion 12 of the central core region 10 has a Δ of substantially 0% relative to pure (undoped) silica, and $-0.20\% \leq \Delta_{1MAX} < 0\%$, and preferably $-0.15\% \leq \Delta_{1MAX} < 0\%$. In still other preferred embodiments, $\Delta_{0MAX}$ is 0% and at least part of the outer portion 14 of the central core region 10 comprises pure (undoped) silica. In still other preferred embodiments, $\Delta_{0MAX}$ is non-negative, and preferably $0\% \leq \Delta_{0MAX} \leq 0.1\%$.

Preferably, $0.2 \mu m \leq R_0 \leq 1.5 \mu m$.

Preferably, $3 \mu m \leq R_1 \leq 4 \mu m$.

In preferred embodiments, the outer portion 14 of the central core region 10 has a relative refractive index with an alpha ($\alpha_1$) profile shape, as shown in the vicinity of arrow 16 in FIG. 1, and preferably $12 \leq \alpha_1 \leq 20$.

Preferably, $-0.60\% \leq \Delta_{2MIN} \leq -0.40\%$. Preferably the absolute magnitude of the difference between $\Delta_{0MAX}$ and $\Delta_{2MIN}$ is between 0.40% and 0.60%, i.e. $0.40\% \leq |\Delta_{0MAX} - \Delta_{2MIN}| 0.60\%$; more preferably $0.45\% \leq |\Delta_{0MAX} - \Delta_{2MIN}| \leq 0.55\%$.

Preferably, the value of the relative refractive index corresponding to $(\Delta_{2MIN} - \Delta_{1MAX})/2$ occurs at a radius defined herein as a half height radius $R1_{HH}$, wherein $2.7 \mu m \leq R1HH \leq 3.4 \mu m$.

Preferably, $13 \mu m \leq R_2 \leq 29 \mu m$, more preferably $14 \mu m \leq R_2 \leq 20 \mu m$.

Preferably, $-0.65\% \leq \Delta_{3MAX} \leq -0.45\%$. In some preferred embodiments, $-0.60\% \leq \Delta_{3MAX} \leq -0.45\%$.

In some preferred embodiments, $\Delta_{3MAX} = \Delta_{2MIN}$, and the refractive index of the annular region 30 is matched to the outer cladding 40. The annular region 30 may be referred to as an inner cladding, resulting in a core comprised of the central region 10, and a cladding comprised of the inner and outer claddings.

The annular region 30 extends from $R_1$ to the outer radius $R_2$. The width $W_2$ is defined as the radial distance between $R_1$ and $R_2$. The midpoint $R_{2MID}$ occurs in the middle of $R_1$ and $R_2$.

The optical fiber disclosed herein preferably comprises a core comprising $SiO_2$, fluorine, and an alkali metal selected from the group consisting of K, Na, Li, Cs and Rb. Preferably, the alkali is provided in the form of an alkali metal oxide dopant, which is preferably provided in the core in an amount of at least 20 ppm wt. %. $K_2O$ is the most preferred alkali metal oxide.

Preferably, a peak in the alkali metal oxide concentration in the core is substantially coincident with the centerline of the optical fiber. In preferred embodiments, the concentration of alkali metal oxide (such as $K_2O$) at radii greater than 10 μm is less than 50% of the peak concentration. In some preferred embodiments, the peak concentration of alkali metal oxide in the core of the optical fiber is between 20-1000 ppm wt. %.; in other preferred embodiments, between 50-500 ppm wt. %; in still other preferred embodiments, 50-300 ppm wt. %; and yet other preferred embodiments, between 50-200 ppm wt. %.

Preferably, the core is doped with fluorine. Preferably, the outer portion 14 of the central core region 10 is doped with fluorine in an amount greater than 1000 ppm wt. % (0.1 wt. % F); more preferably greater than 2000 ppm wt. % (0.2 wt. % F); even more preferably greater than 3000 ppm wt. % (0.3 wt. % F); and in some preferred embodiments, between about 1000 ppm wt. % (0.1 wt. % F) and 5000 (0.5 wt. % F).

Preferably, the cladding 40, as well as the annular region 30, are doped with fluorine, preferably in an amount between 10,000 ppm wt. % (1.0 wt. %) and 30,000 ppm wt. % (3.0 wt.

%), more preferably between about 10,000 ppm wt. % (1.0 wt. %) and 20,000 ppm wt. % (2.0 wt. %), and even more preferably between about 12,500 ppm wt. % (1.25 wt. %) and 17,500 ppm wt. % (1.75 wt. %). In some preferred embodiments; the optical fiber contains fluorine from a radius of about 1 μm to the outermost periphery of the cladding 40.

Preferably, the optical fiber is doped with chlorine. Preferably, the central core region 10 comprises chlorine in a peak amount of less than 2000 ppm wt. % (0.2 wt. %).

Tables 1-4 list an illustrative first set of preferred embodiments, Examples 1-10. FIGS. 1-10 show the corresponding refractive index profiles of Examples 1-10 by curves A-J, respectively.

TABLE 1

| | | Example | | | | |
|---|---|---|---|---|---|---|
| | | 1 | 2 | 3 | 4 | 5 |
| $\Delta_{0MAX}$ | % | 0.00 | 0.00 | 0.00 | 0.00 | 0.00 |
| $R_0$ | μm | 1.25 | 1.25 | 1.25 | 1.25 | 1.25 |
| $\Delta_{1MAX}$ | % | −0.05 | −0.10 | −0.10 | −0.10 | −0.10 |
| $|\Delta_{0MAX} - \Delta_{1MAX}|$ | μm | 0.05 | 0.10 | 0.10 | 0.10 | 0.10 |
| $R_1$ | μm | 2.7 | 2.8 | 2.8 | 2.9 | 3.0 |
| $\Delta_{2\,MIN}$ | % | −0.52 | −0.55 | −0.57 | −0.52 | −0.52 |
| $R_2$ | μm | 17.0 | 16.0 | 16.0 | 15.5 | 15.5 |
| $R_2/R_1$ | — | 6.27 | 5.82 | 5.71 | 5.34 | 5.17 |
| $W_2$ | μm | 14.29 | 13.25 | 13.20 | 12.60 | 12.50 |
| $R_{2MID}$ | μm | 7.15 | 6.63 | 6.60 | 6.30 | 6.25 |
| ½ ($\Delta_{2\,MIN} - \Delta_{1MAX}$) | % | −0.24 | −0.23 | −0.23 | −0.21 | −0.21 |
| R1HH | μm | 2.7 | 2.7 | 2.7 | 2.8 | 2.9 |
| $\Delta_{3MAX}$ | % | −0.54 | −0.57 | −0.57 | −0.54 | −0.54 |
| $\Delta_{1MAX} - \Delta_{0MAX}$ | % | −0.05 | −0.10 | −0.10 | −0.10 | −0.10 |
| $\Delta_{2MAX} - \Delta_{0MAX}$ | % | −0.52 | −0.55 | −0.57 | −0.52 | −0.52 |
| $\Delta_{2MAX} - \Delta_{1MAX}$ | % | −0.47 | −0.45 | −0.47 | −0.42 | −0.42 |

TABLE 2

| | | Example | | | | |
|---|---|---|---|---|---|---|
| | | 1 | 2 | 3 | 4 | 5 |
| Dispersion @ 1310 nm | ps/nm-km | −7.6 | −7.3 | −6.8 | −6.3 | −5.2 |
| Dispersion @ 1400 nm | ps/nm-km | −1.4 | −1.0 | −0.6 | 0.1 | 1.2 |
| Dispersion @ 1440 nm | ps/nm-km | 1.1 | 1.5 | 1.9 | 2.6 | 3.7 |
| Dispersion @ 1530 nm | ps/nm-km | 6.3 | 6.7 | 7.0 | 7.9 | 8.9 |
| Dispersion @ 1550 nm | ps/nm-km | 7.4 | 7.8 | 8.1 | 9.0 | 10.0 |
| Dispersion @ 1625 nm | ps/nm-km | 11.4 | 11.8 | 12.0 | 13.1 | 14.0 |
| Slope @ 1310 nm | ps/nm$^2$-km | 0.075 | 0.076 | 0.075 | 0.077 | 0.077 |
| Slope @ 1550 nm | ps/nm$^2$-km | 0.055 | 0.055 | 0.054 | 0.055 | 0.055 |
| Lambda Zero | nm | 1411 | 1406 | 1400 | 1391 | 1377 |
| MFD @ 1310 nm | μm | 7.34 | 7.38 | 7.27 | 7.63 | 7.66 |
| MFD @ 1550 nm | μm | 8.93 | 8.96 | 8.77 | 9.24 | 9.18 |
| Aeff @ 1310 nm | μm$^2$ | 40.4 | 40.7 | 39.7 | 43.6 | 44.1 |
| Aeff @ 1550 nm | μm$^2$ | 59.0 | 59.3 | 56.9 | 63.1 | 62.4 |
| Pin Array @ 1550 nm | dB | 16.3 | 15.7 | 16.6 | 19.4 | 15.9 |
| Lateral Load @ 1550 nm | dB/m | 0.82 | 0.68 | 0.38 | 0.83 | 0.54 |
| Attenuation @ 1550 nm | dB/km | 0.178 | 0.177 | 0.177 | 0.175 | 0.175 |
| LP11 | nm | 1326 | 1266 | 1050 | 1251 | 1178 |
| LP02 | nm | 1647 | 1563 | 1065 | 1513 | 1398 |
| Cable Cutoff | nm | 1647 | 1563 | 1065 | 1513 | 1398 |

TABLE 3

| | | Example | | | | |
|---|---|---|---|---|---|---|
| | | 6 | 7 | 8 | 9 | 10 |
| $\Delta_{0MAX}$ | % | 0.00 | 0.00 | 0.00 | 0.06 | 0.00 |
| $R_0$ | μm | 1.25 | 1.25 | 1.25 | 1.25 | 1.25 |
| $\Delta_{1MAX}$ | % | −0.06 | −0.10 | −0.10 | 0.00 | −0.15 |
| $|\Delta_{0MAX} - \Delta_{1MAX}|$ | μm | 0.06 | 0.10 | 0.10 | 0.06 | 0.15 |
| $R_1$ | μm | 3.00 | 3.20 | 3.33 | 3.00 | 3.00 |
| $\Delta_{2\,MIN}$ | % | −0.48 | −0.52 | −0.51 | −0.45 | −0.56 |
| $R_2$ | μm | 15.5 | 16.0 | 16.0 | 15.5 | 15.5 |
| $R_2/R_1$ | — | 5.17 | 5.00 | 4.81 | 5.17 | 5.17 |
| $W_2$ | μm | 12.50 | 12.80 | 12.68 | 12.50 | 12.50 |
| $R_{2MID}$ | μm | 6.25 | 6.40 | 6.34 | 6.25 | 6.25 |
| ½ ($\Delta_{2\,MIN} - \Delta_{1MAX}$) | % | −0.21 | −0.21 | −0.21 | −0.23 | −0.20 |
| R1HH | μm | 2.9 | 3.1 | 3.2 | 3.0 | 2.8 |
| $\Delta_{3MAX}$ | % | −0.50 | −0.53 | −0.52 | −0.47 | −0.57 |
| $\Delta_{1MAX} - \Delta_{0MAX}$ | % | −0.06 | −0.10 | −0.10 | −0.06 | −0.15 |
| $\Delta_{2MAX} - \Delta_{0MAX}$ | % | −0.48 | −0.52 | −0.51 | −0.51 | −0.55 |
| $\Delta_{2MAX} - \Delta_{1MAX}$ | % | −0.42 | −0.42 | −0.41 | −0.45 | −0.41 |

TABLE 4

| | | Example | | | | |
|---|---|---|---|---|---|---|
| | | 6 | 7 | 8 | 9 | 10 |
| Dispersion @ 1310 nm | ps/nm-km | −5.2 | −3.3 | −2.4 | −5.1 | −5.5 |
| Dispersion @ 1400 nm | ps/nm-km | 1.2 | 3.1 | 4.0 | 1.3 | 0.9 |
| Dispersion @ 1440 nm | ps/nm-km | 3.7 | 5.6 | 6.6 | 3.8 | 3.4 |
| Dispersion @ 1530 nm | ps/nm-km | 9.0 | 10.8 | 11.8 | 8.9 | 8.7 |
| Dispersion @ 1550 nm | ps/nm-km | 10.1 | 11.9 | 12.9 | 10.0 | 9.8 |
| Dispersion @ 1625 nm | ps/nm-km | 14.1 | 15.8 | 16.8 | 13.9 | 13.8 |
| Slope @ 1310 nm | ps/nm$^2$-km | 0.077 | 0.078 | 0.079 | 0.077 | 0.077 |
| Slope @ 1550 nm | ps/nm$^2$-km | 0.055 | 0.054 | 0.054 | 0.054 | 0.055 |
| Lambda Zero | nm | 1377 | 1352 | 1341 | 1376 | 1381 |
| MFD @ 1310 nm | μm | 7.75 | 7.73 | 7.87 | 7.51 | 7.66 |
| MFD @ 1550 nm | μm | 9.30 | 9.11 | 9.21 | 8.94 | 9.21 |
| Aeff @ 1310 nm | μm$^2$ | 45.2 | 45.3 | 47.1 | 42.6 | 43.9 |
| Aeff @ 1550 nm | μm$^2$ | 64.1 | 61.8 | 63.3 | 59.3 | 62.7 |
| Pin Array @ 1550 nm | dB | 19.5 | 9.0 | 7.6 | 9.4 | 17.8 |
| Lateral Load @ 1550 nm | dB/m | 0.67 | 0.31 | 0.29 | 0.33 | 0.60 |
| Attenuation @ 1550 nm | dB/km | 0.175 | 0.175 | 0.174 | 0.177 | 0.174 |
| LP11 | nm | 1175 | 1178 | 1208 | 1194 | 1170 |
| LP02 | nm | 1393 | 1267 | 1263 | 1411 | 1396 |
| Cable Cutoff | nm | 1393 | 1267 | 1263 | 1411 | 1396 |

In embodiments disclosed herein represented by Examples 1-8 and 10, $\Delta_{0MAX}$ is substantially 0% relative to pure silica. Some small amount of alkali metal oxide may be present at or near the centerline without producing a substantial increase in the relative refractive index.

In embodiments illustrated by Example 9, $\Delta_{0MAX}$ is positive.

In embodiments illustrated by Examples 3, 7 and 8, transmission of optical signals is single-moded in a 1310 nm window, the E-band, the S-band, the C-band, the L-band, and at higher wavelengths.

In some preferred embodiments, $\Delta_0\%(r)$ for some, preferably most, of the portion between the centerline (r=0) and $R_0$ has an α-profile with an $\alpha_0$, greater than 2, more preferably greater than 3, even more preferably greater than 4, and in some preferred embodiments greater than 5. In preferred embodiments, $\alpha_0$ is also less than 10.

In preferred embodiments, $\Delta\%(r)$ is less than or equal to 0% for radii up to 20 microns, more preferably up to 30 microns, and even more preferably for all radii, i.e. from r=0 at the centerline to r=$R_{MAX}$, where $R_{MAX}$ is the outermost radius of the silica-based part of the optical fiber (excluding any coating). In preferred embodiments, $R_{MAX}$ is about 62.5 μm.

The optical fibers disclosed herein can be made by a vapor deposition process, such as by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

The clad layer 40 may be comprised of a cladding material which was deposited, for example during a laydown process, or which was provided in the form of a jacketing, such as a tube in a rod-in-tube optical preform arrangement, or a combination of deposited material and a jacket. The clad layer 40 may include one or more dopants. The clad layer 40 is surrounded by a primary coating P and a secondary coating S.

Preferably, the optical fiber disclosed herein has a silica-based core and cladding. In preferred embodiments, the cladding has an outer diameter, 2*R,max, of about 125 μm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably the coating has a constant diameter, radially and along the length of the fiber.

Figure 11:
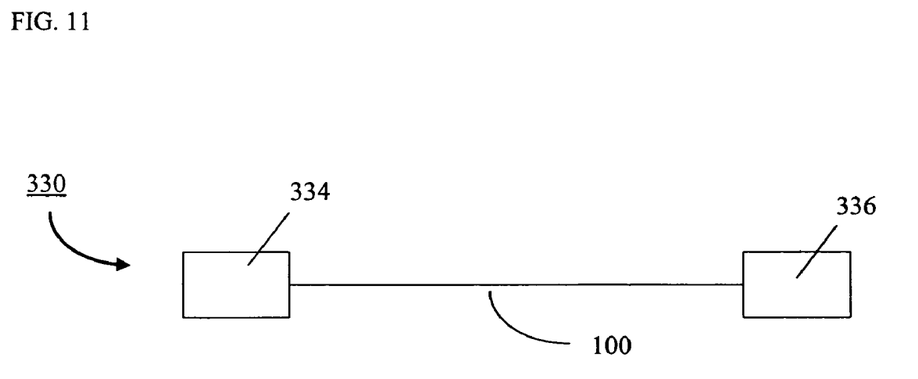
FIG. 11 is a schematic view of a fiber optic communication system employing an optical fiber as disclosed herein.

As shown in FIG. 11, an optical fiber 100 as disclosed herein may be implemented in an optical fiber communication system 330. System 330 includes a transmitter 334 and a receiver 336, wherein optical fiber 100 allows transmission of an optical signal between transmitter 334 and receiver 336. System 330 is preferably capable of 2-way communication, and transmitter 334 and receiver 336 are shown for illustration only. The system 330 preferably includes a link which has a section or a span of optical fiber as disclosed herein. The system 330 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Preferably, the optical fibers disclosed herein have a low water content, and preferably are low water peak optical fibers, i.e. having an attenuation curve which exhibits a relatively low, or no, water peak in a particular wavelength region, especially in the E-band.

Methods of producing low water peak optical fiber can be found in PCT Application Publication Numbers WO00/64825, WO01/47822, and WO02/051761, the contents of each being hereby incorporated by reference.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of optical fiber.

The system preferably further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band. In one preferred embodiment, the system operates at one or more wavelengths between 1530 and 1565 nm.

In one preferred embodiment, the system comprises a section of optical fiber as disclosed herein having a length of not more than 20 km. In another preferred embodiment, the system comprises a section of optical fiber as disclosed herein having a length of greater than 20 km. In yet another preferred embodiment, the system comprises a section of optical fiber as disclosed herein having a length of greater than 70 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

In a preferred embodiment, a system disclosed herein comprises an optical source, an optical fiber as disclosed herein optically coupled to the optical source, and a receiver optically coupled to the optical fiber for receiving the optical signals transmitted through the optical fiber, the optical source having the capability of dithering, and/or phase modulating, and/or amplitude modulating, the optical signal generated by the optical source, and the optical signal is received by the receiver.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical waveguide fiber comprising a central core region, a zero-dispersion wavelength less than 1450 nm, a dispersion slope at a wavelength of 1550 of less than 0.06 ps/nm$^2$/km, and an attenuation at a wavelength of 1550 nm less than 0.190 dB/km, wherein the central core region comprises a central portion and an outer portion surrounding and directly adjacent the central portion, and the central portion extends radially outwardly from the centerline to a central portion outer radius, $R_0$, and has a relative refractive index percent, $\Delta_0\%(r)$ with a maximum relative refractive index percent, $\Delta_{0MAX}$;

wherein the outer portion extends radially outwardly from the central region to a core radius, $R_1$, the outer portion having a relative refractive index percent, $\Delta_1\%(r)$ with a maximum relative refractive index percent, $\Delta_{1MAX}$, wherein $\Delta_{1MAX}$ is non-positive.

2. The optical waveguide fiber of claim 1 wherein the optical fiber has an effective area at a wavelength of 1550 nm of greater than 50 µm$^2$.

3. The optical waveguide fiber of claim 1 wherein the optical fiber has a dispersion at a wavelength of 1550 nm between 5 and 15 ps/nm-km.

4. The optical waveguide fiber of claim 1 wherein the optical fiber has a dispersion at a wavelength of 1440 nm is greater than 1.0 ps/nm-km.

5. The optical waveguide fiber of claim 1 wherein the optical fiber has an absolute magnitude of a dispersion at a wavelength of 1400 nm less than 5.0 ps/nm-km.

6. The optical waveguide fiber of claim 1 wherein the optical fiber has an absolute magnitude of the dispersion at a wavelength of 1310 nm less than 8.0 ps/nm-km.

7. The optical waveguide fiber of claim 1 wherein the optical fiber has a mode field diameter at a wavelength of 1310 nm greater than 7.0 µm$^2$.

8. A system comprising an optical source, a receiver, and the optical fiber of claim 1 optically connecting the optical source and the receiver, wherein the optical source is capable of generating optical signals in a wavelength range of 1530 to 1565 nm.

9. An optical waveguide fiber comprising a central core region, an annular region surrounding and directly adjacent the central core region, and an outer cladding surrounding and directly adjacent the annular region;

wherein the central core region comprises a central portion and an outer portion surrounding and directly adjacent the central portion, and the central portion extends radially outwardly from the centerline to a central portion outer radius, $R_0$, and has a relative refractive index percent, $\Delta_0\%(r)$ with a maximum relative refractive index percent, $\Delta_{0MAX}$;

wherein the outer portion extends radially outwardly from the central region to a core radius, $R_1$, the outer portion having a relative refractive index percent, $\Delta_1\%(r)$ with a maximum relative refractive index percent, $\Delta_{1MAX}$;

wherein the annular region surrounds and is directly adjacent the outer portion of the central core region, and has a negative relative refractive index percent, $\Delta_2\%(r)$ with a maximum relative refractive index percent, $\Delta_{2MIN}$; and wherein the optical waveguide fiber comprises a zero-dispersion wavelength less than 1450 mm, a dispersion slope at a wavelength of 1550 of less than 0.06 ps/nm²/km, and an attenuation at a wavelength of 1550 nm less than 0.190 dB/km.

10. The optical waveguide fiber of claim 9 wherein $\Delta_{2MIN} < \Delta_{1MAX} \leq \Delta_{0MAX}$.

11. The optical waveguide fiber of claim 9 wherein $-0.1\% \leq \Delta_{0MAX} \leq 0.1\%$.

12. The optical waveguide fiber of claim 9 wherein the outer cladding has a relative refractive index percent, $\Delta_3\%(r)$ with a maximum relative refractive index percent, $\Delta_{3MAX}$, wherein $|\Delta_{2MIN} - \Delta_{3MAX}| \leq 0.05\%$.

13. The optical waveguide fiber of claim 9 wherein $-0.60\% \leq \Delta_{2MIN} \leq -0.40\%$.

14. An optical waveguide fiber comprising a zero-dispersion wavelength less than 1450 nm, a dispersion slope at a wavelength of 1550 of less than 0.06 ps/nm²/km, and an attenuation at a wavelength of 1550 nm less than 0.190 dB/km, wherein the optical fiber has a dispersion at a wavelength of 1550 nm between 5 and 15 ps/nm-km.

15. The optical waveguide fiber of claim 14 wherein the optical fiber has an effective area at a wavelength of 1550 nm of greater than 50 µm².

16. The optical waveguide fiber of claim 14 wherein the optical fiber has a dispersion at a wavelength of 1440 nm is greater than 1.0 ps/nm-km.

17. The optical waveguide fiber of claim 14 wherein the optical fiber has an absolute magnitude of a dispersion at a wavelength of 1400 nm less than 5.0 ps/nm-km.

18. The optical waveguide fiber of claim 14 wherein the optical fiber has an absolute magnitude of the dispersion at a wavelength of 1310 nm less than 8.0 ps/nm-km.

19. The optical waveguide fiber of claim 14 wherein the optical fiber has a mode field diameter at a wavelength of 1310 nm greater than 7.0 µm².

* * * * *